US009586688B2

(12) United States Patent  
Blignaut et al.

(10) Patent No.: US 9,586,688 B2  
(45) Date of Patent: Mar. 7, 2017

(54) SWOOPER HARNESS

(71) Applicant: Uninsured United Parachute Technologies, LLC, DeLand, FL (US)

(72) Inventors: Daniel P. J. Blignaut, DeLand, FL (US); Vincent Philippe Benjamin Reffet, Port Sainte Fury (FR)

(*) Notice: Subject to any disclaimer, the term of this patent is extended or adjusted under 35 U.S.C. 154(b) by 75 days.

(21) Appl. No.: 14/121,458

(22) Filed: Sep. 9, 2014

(65) Prior Publication Data

US 2015/0069186 A1    Mar. 12, 2015

Related U.S. Application Data

(60) Provisional application No. 61/960,145, filed on Sep. 11, 2013.

(51) Int. Cl.  
*B64D 17/30* (2006.01)

(52) U.S. Cl.  
CPC .................... *B64D 17/30* (2013.01)

(58) Field of Classification Search  
CPC ........ B64D 17/10; B64D 17/22; B64D 22/30; B64D 17/30; B64D 17/34; B64D 17/36; B64D 17/38  
USPC ........................ 244/151 A, 152, 147, 151 R  
See application file for complete search history.

(56) References Cited

U.S. PATENT DOCUMENTS

| | | | | |
|---|---|---|---|---|
| 2,292,639 A * | 8/1942 | Horning | ................. | B64D 17/30 244/151 R |
| 4,337,913 A * | 7/1982 | Booth | .................... | B64D 17/38 24/573.11 |
| 4,378,921 A * | 4/1983 | Allen | ..................... | B64D 17/30 182/6 |
| 4,467,986 A * | 8/1984 | Birch | ..................... | B64D 17/62 244/147 |
| 6,056,242 A * | 5/2000 | Collins | ................. | B64D 17/38 244/147 |
| 6,626,400 B1 * | 9/2003 | Booth | .................... | B64D 17/52 244/149 |
| 8,123,171 B2 * | 2/2012 | McHugh | ................ | B64D 17/30 244/137.3 |
| 8,528,866 B2 | 9/2013 | Fradet | | |

* cited by examiner

*Primary Examiner* — Tien Dinh  
*Assistant Examiner* — Vicente Rodriguez  
(74) *Attorney, Agent, or Firm* — Frank B. Arenas, Esq.

(57) ABSTRACT

An article of manufacture, a parachute harness with main risers, configured in vertical flight mode, further comprising a vertical-to-supine upper riser release mechanism integrated into the parachute harness, further comprising a lower cutaway release mechanism integrated into the parachute harness, wherein when the operator is in vertical flight mode and releases the vertical-to-supine upper release mechanism, the parachute harness transitions to supine flight mode is disclosed.

10 Claims, 16 Drawing Sheets

SWOOPER HARNESS

CROSS REFERENCE TO RELATED APPLICATIONS

This Nonprovisional Application for Patent incorporates by reference (to the extent it does not conflict with the disclosure herein) and claims the benefit and priority of Provisional Application having Application No. 61/960,145, Confirmation No. 8342 entitled "Swooper Harness," filed Sep. 11, 2013 commonly owned with the instant Application.

COPYRIGHT NOTICE

A portion of the disclosure of this Patent document, including the drawings and Appendices, contain material which is subject to copyright protection. The copyright owner has no objection to the facsimile reproduction by anyone of the Patent document or the Patent disclosure as it appears in the Patent and Trademark Office Patent files or records, but otherwise reserves all copyright rights whatsoever.

BACKGROUND OF THE INVENTION

Field of the Invention

Versions and embodiments of the present invention relate generally to parachute equipment. Particularly, embodiments of the invention relate to parachute harnesses and use thereof. More particularly, versions of the invention relate to parachute harnesses that may be modified in flight under canopy. Specifically, versions of the invention relate to parachute harnesses that may be configured from hanging vertically to a supine flight position after parachute deployment and new, useful and unobvious versions thereof.

Description/Background of the Related Art.

The art discussed herein is not to be considered admitted prior art but is presented to more clearly discuss and describe what is still lacking in the earlier art.

Parachute harnesses have evolved over the years from uncomfortable military "saddle seat" types in the 1950s and 1960s adapted by parachute jumpers for sport use. Sport harnesses (now also adopted by the military) advanced comfort by using "split saddle" types that enveloped each leg at the crotch area and by spreading the legs apart, reducing stress on the crotch area. These improvements worked well enough, but still were uncomfortable if parachutists opened their main parachute (also called main canopy) high and stayed suspended from the parachute for longer flight times. With a rate of descent of about 1,000 feet per minute, these flight times increased from approximately 2 minutes for an opening at 2,000 feet above ground level (AGL) to 14 minutes from 13,500 feet AGL for canopy formation parachutists and up to 30 minutes or more at 35,000 feet AGL for military High Altitude-High Opening (HAHO). Sometimes referred to as "hang time," these increased hang times also increased discomfort and potentially medical dangerous "suspension trauma" that cut-off blood flow to legs and subsequent unconsciousness if continued too long without relief.

Another aspect is the drag induced from conventional parachute harnesses slows down the forward speed of the parachute in flight. Drag of the cargo/parachutist/pilot suspended under a ram-air wing-type parachute is a function of the area (square feet or square meters) of the cargo that impinges the relative wind while gliding. This relative wind is from roughly slightly below horizontal to the ground and is the forward flight/drag vector components of the cargo flying through the air. For example only and not intended to be limiting, an average person (parachutist) hanging vertically in a conventional harness under canopy is roughly 9 square feet of frontal body area to the relative wind. These 9 square feet induce more drag as compared to the drag induced by that same person in supine position of roughly 4 to 5 square feet of frontal body area to the relative wind. This reduction of parasitic drag from 9 square feet to roughly 4.5 square feet of the pilot/parachutist/cargo increases performance, glide slope and forward speed under parachute, providing benefits not available using conventional harnesses. This is for example, not intended to limit. This is especially beneficial for "swoop competitions" held in sport parachuting, where the object is to land the parachute as fast as possible and glide as far as possible just inches above the ground. In sport parachute swoop distance competitions, just a few extra feet gliding inches above the ground can make the difference of winning a first place trophy (and potentially cash prizes) and not placing in the top three slots at all, winning nothing. The swoop harness solves this problem of pilot/parachutist drag to glide further than conventional harnesses.

No parachute harness and/or system is known to this applicant that addresses these deficiencies in the earlier art as is used in conventional parachute harnesses. This new, useful and unobvious invention, in various embodiments, accomplishes this much needed advantage of increase in comfort and safety for the parachute pilot and decrease of parasitic drag of pilot/cargo in conventional parachute harnesses and/or systems.

SUMMARY OF THE INVENTION

Advantages of versions of the present invention include benefits, features and problems solved by versions of the invention include:

1. Because of less pilot drag in swoop/supine mode, parachute and pilot fly faster and farther than conventional parachute harnesses.

2. Because of the supine suspension of the pilot in swoop mode, greater comfort and lack of potential for "suspension trauma" type injuries to the pilot versus a conventional parachute harness.

3. Because the invention allows flight under parachute in either conventional vertical or swoop/supine mode at the pilot's option, it is effectively 2 parachute harnesses in 1.

The foregoing objects, benefits and advantages of versions of the invention are illustrative of those which can be addressed by versions of the invention and not intended to be limiting or exhaustive of the possible advantages that can be realized. These and other advantages will be apparent from the description herein or can be learned from practicing versions of the invention, both as embodied herein as examples or as modified in view of any variations which may be apparent to those of ordinary skill in the art such as a parachute rigger, parachute equipment manufacturer and/or designer. Therefore, the invention resides in the novel devices, methods, arrangements, systems, combinations and improvements herein shown and described as examples and not limited therein.

BRIEF DESCRIPTION OF THE DRAWINGS

In the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

Figure 1:
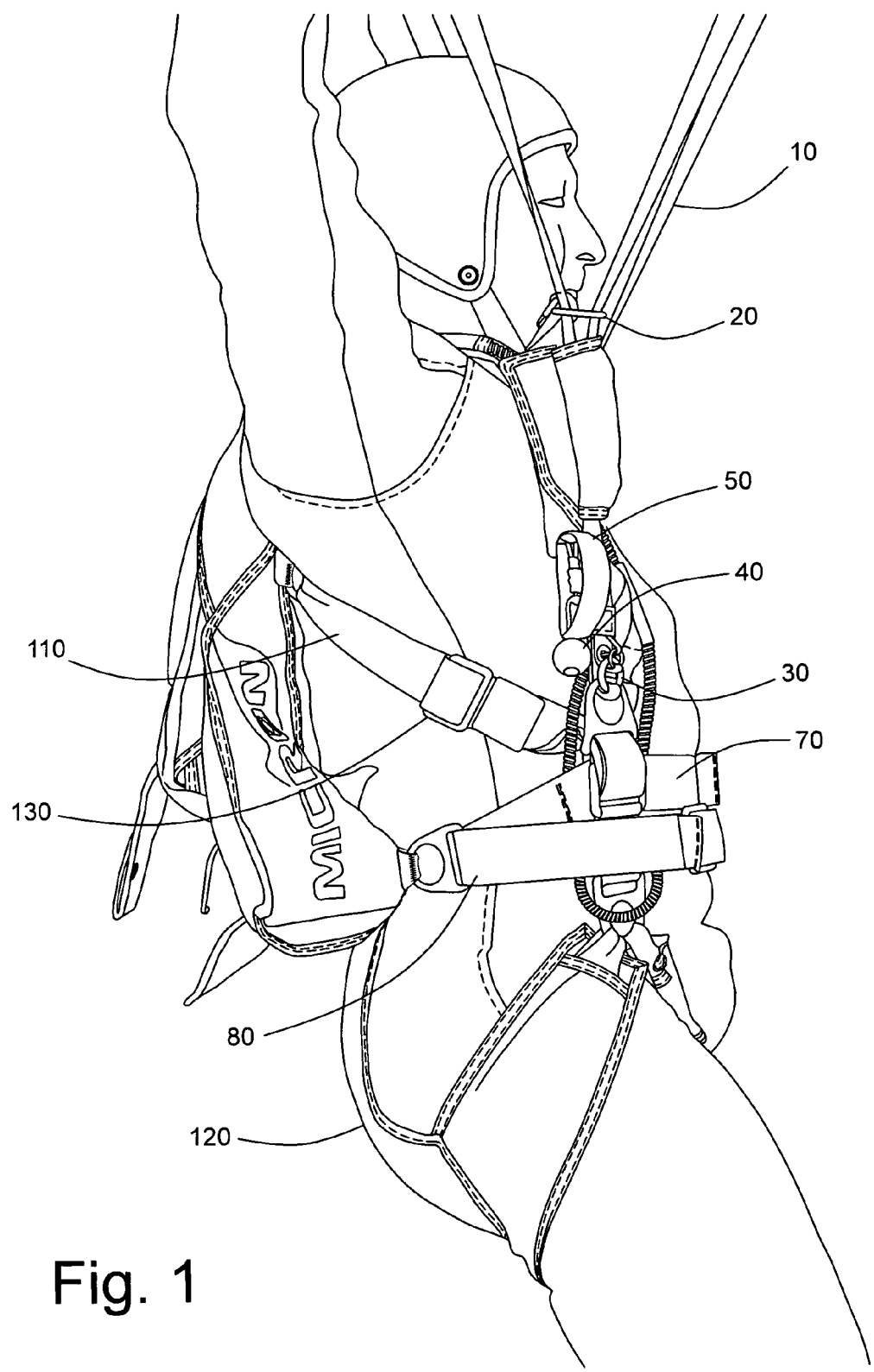
FIG. 1 is a side view of a version of the invention.

While the present invention will be described with reference to the details of the embodiments of the invention shown in the drawings (and some embodiments not shown in the drawings), these details are not intended to limit the scope of the invention. As would be known by one of average skill in the art, such as a parachute rigger, parachute equipment designer and/or parachute equipment manufacturer, modifications may be made that are intended to be within the scope of versions of the invention.

DETAILED DESCRIPTION OF A PREFERRED EMBODIMENT

It is also understood that whenever and/or is used in this patent application it means any combination or permutation of all, one, some, a plurality or none of each of the item or list mentioned, which is not intended to be limiting but merely for example and illustration. It is also understood that (s) designates either singular or plural. It is also understood that "or" is an inclusive "or" to include all items in a list and not intended to be limiting and means any combination or permutation of all, one, some, a plurality or none of each of the item or list mentioned. It is also understood that "include (s)" and/or "including" means "including but not limited to" any combination or permutation of all, one, some, a plurality or none of each of the item or list mentioned. It is also understood that the phraseology and terminology used herein are the purpose of descriptions and are not to be regarded as limiting.

Figure 2:
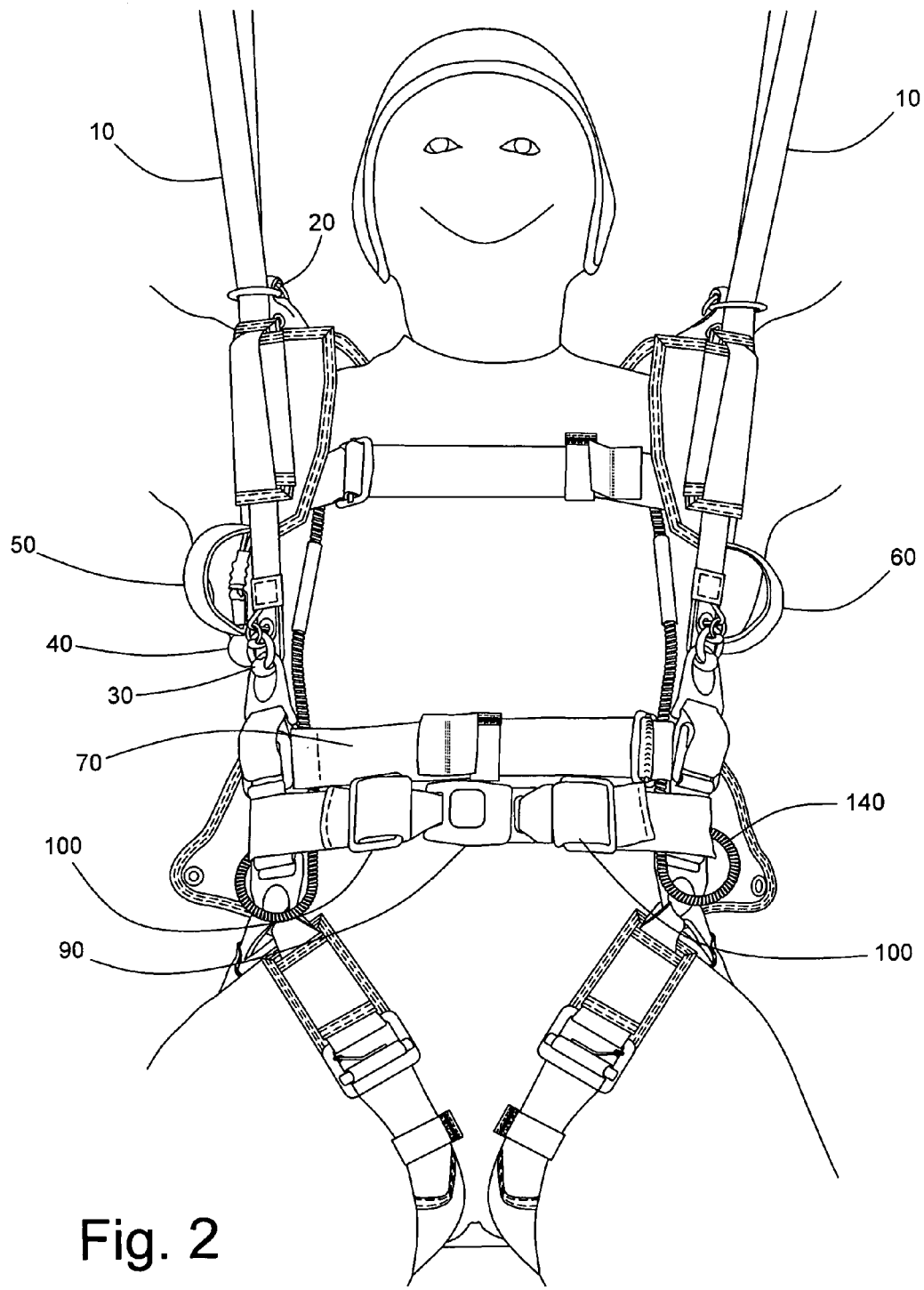
FIG. 2 is a front view of a version of the invention.
Figure 3:
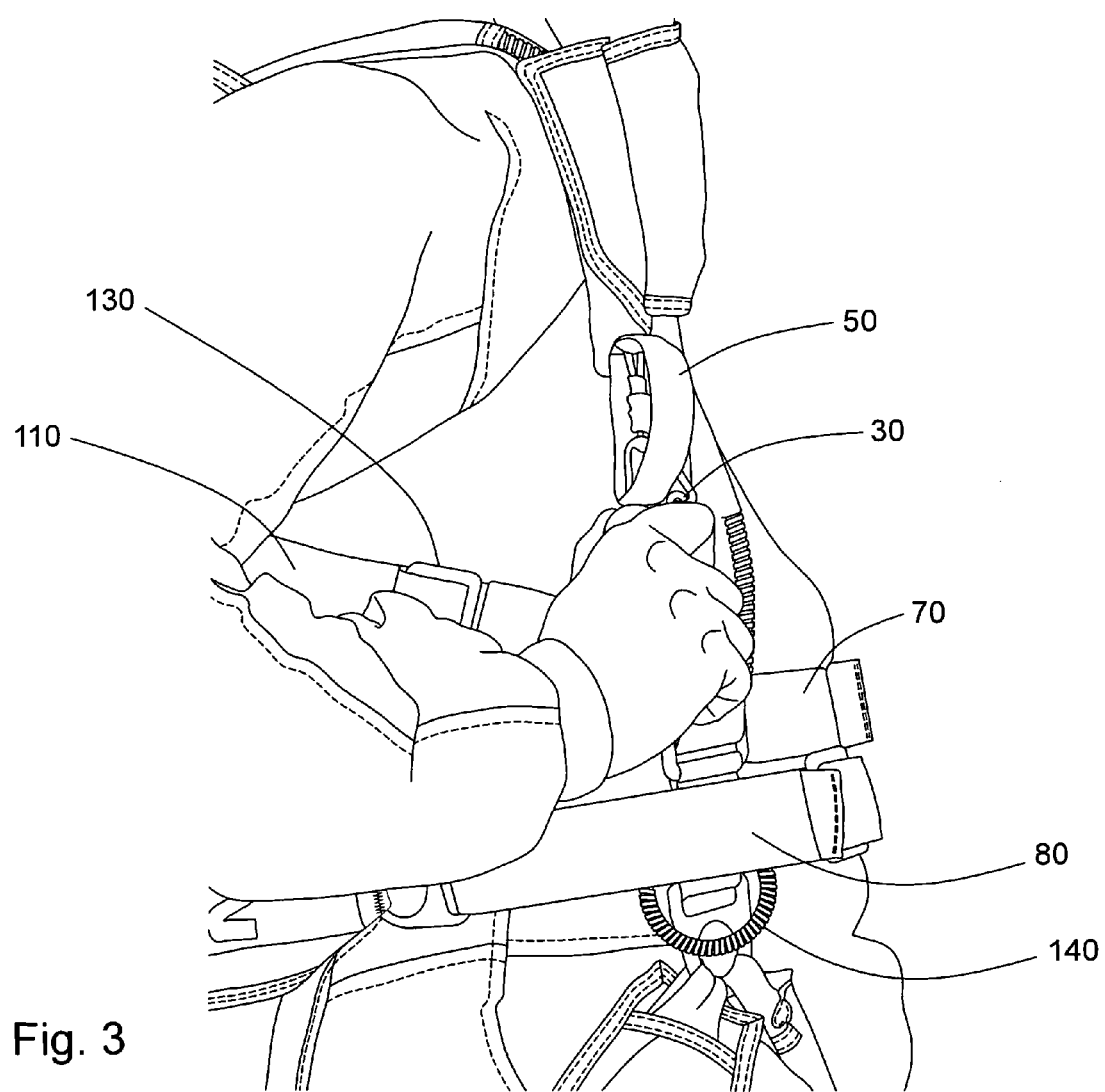
FIG. 3 is a side view of a version of the invention with parachutist initiating release of the vertical-to-supine upper riser release mechanism via the vertical-to-supine upper riser release handle.
Figure 4:
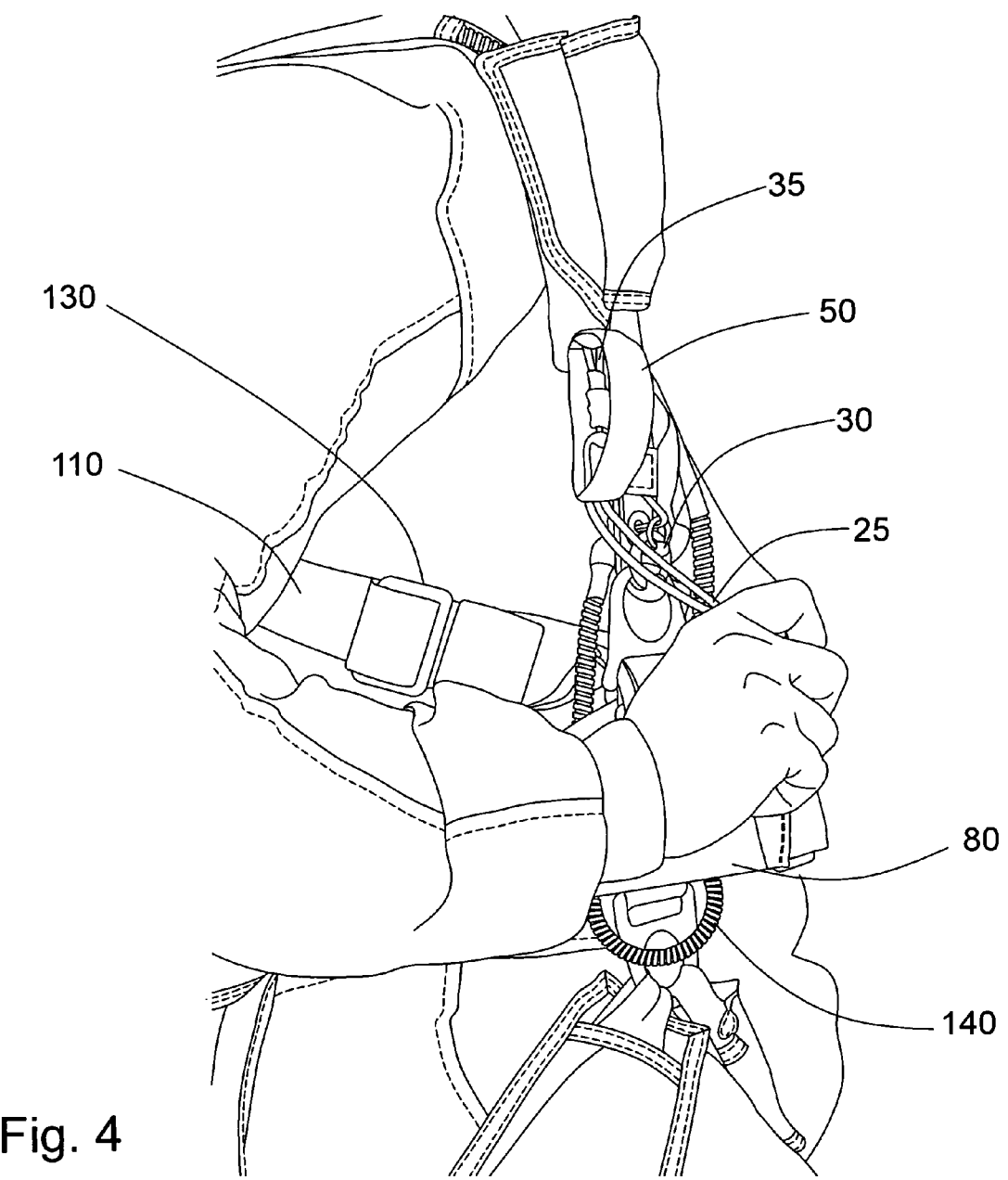
FIG. 4 is a side view of a version of the invention with parachutist releasing the vertical-to-supine upper riser release mechanism via the vertical-to-supine upper riser release handle.
Figure 5:
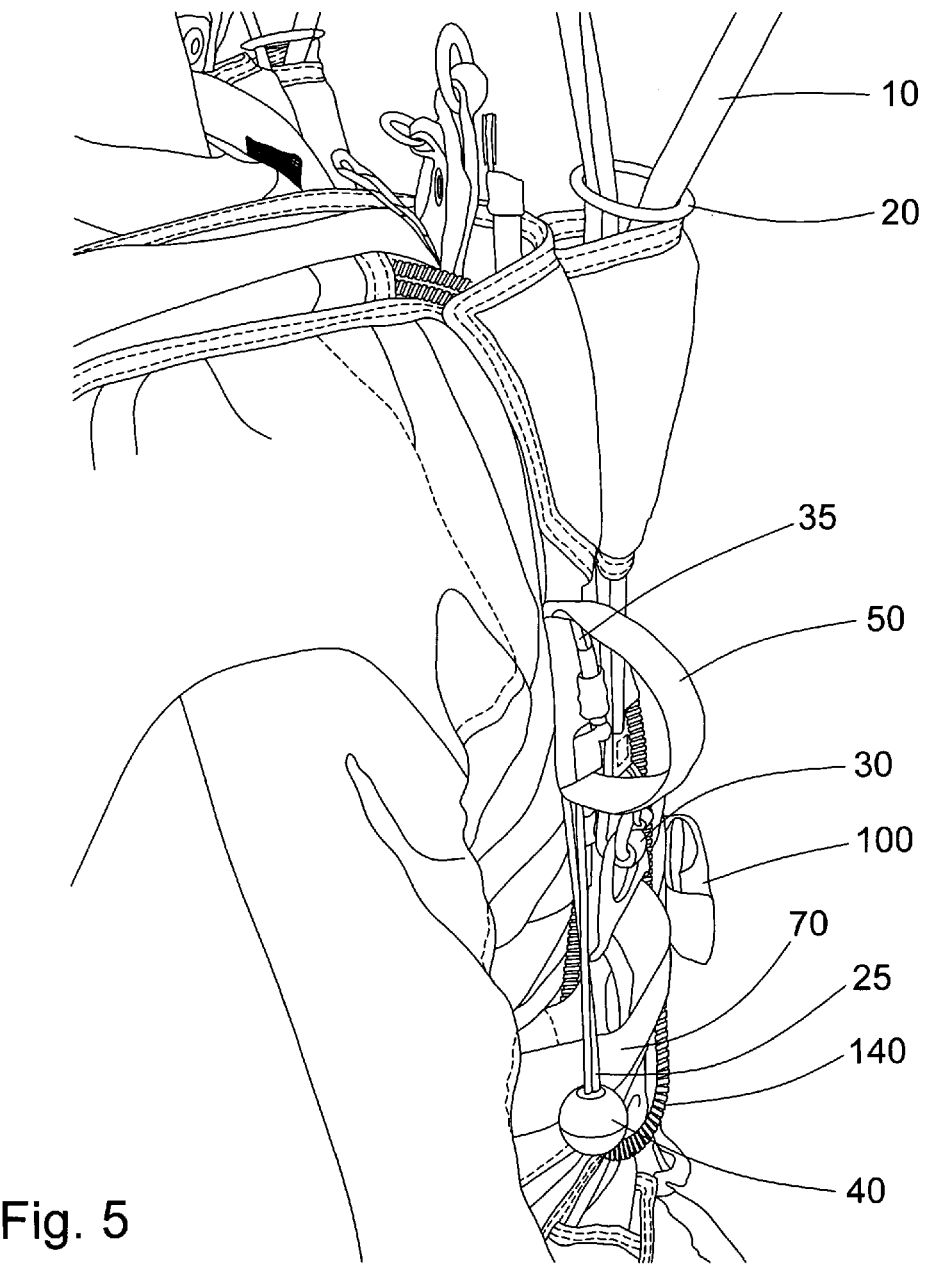
FIG. 5 is a side view of a version of the invention after release of the vertical-to-supine upper riser release mechanism via the vertical-to-supine upper riser release handle.
Figure 6:
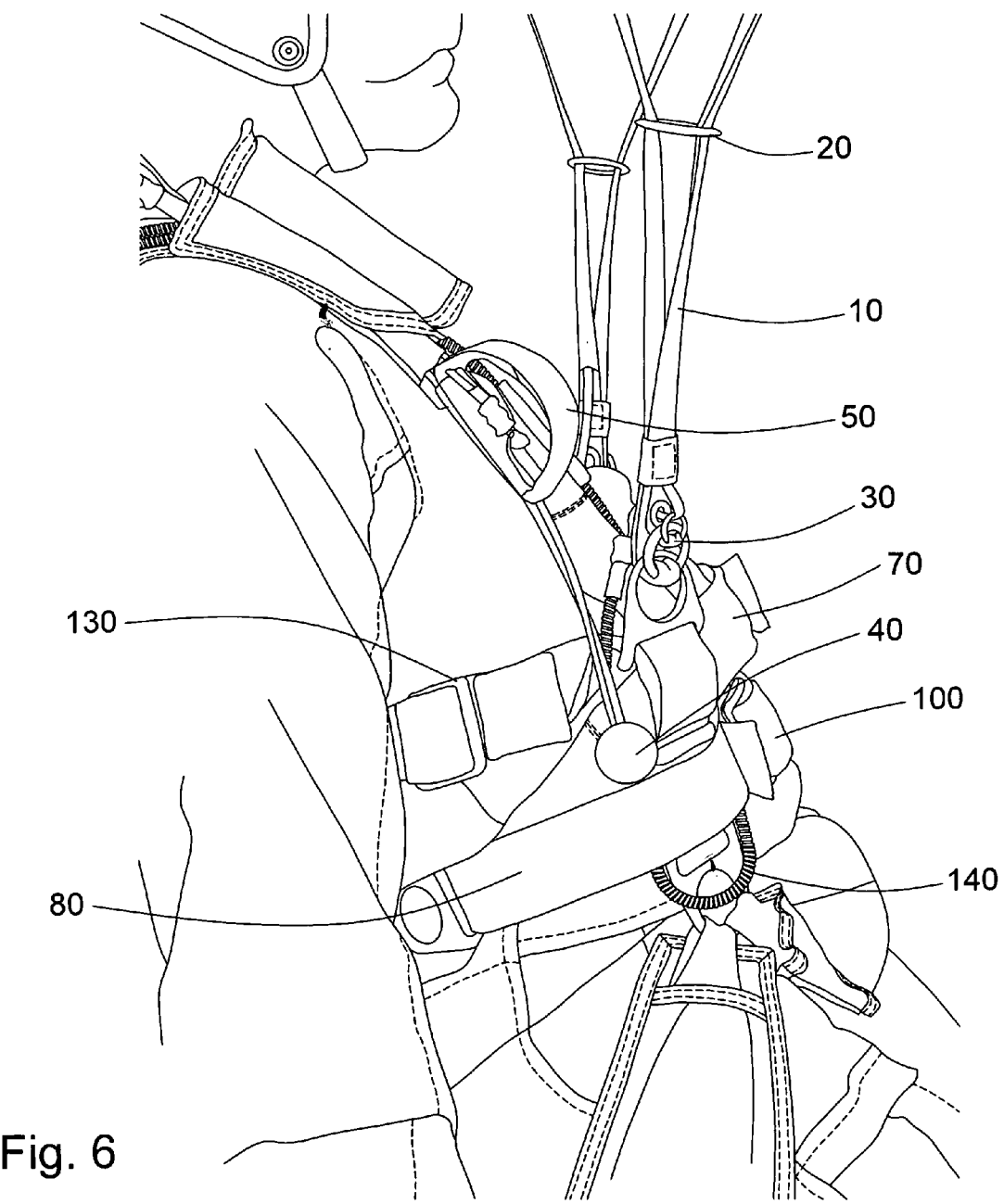
FIG. 6 is a side view of a version of the invention after release of the vertical-to-supine upper riser release mechanism via the vertical-to-supine upper riser release handle to transition to partial supine mode.
Figure 7:
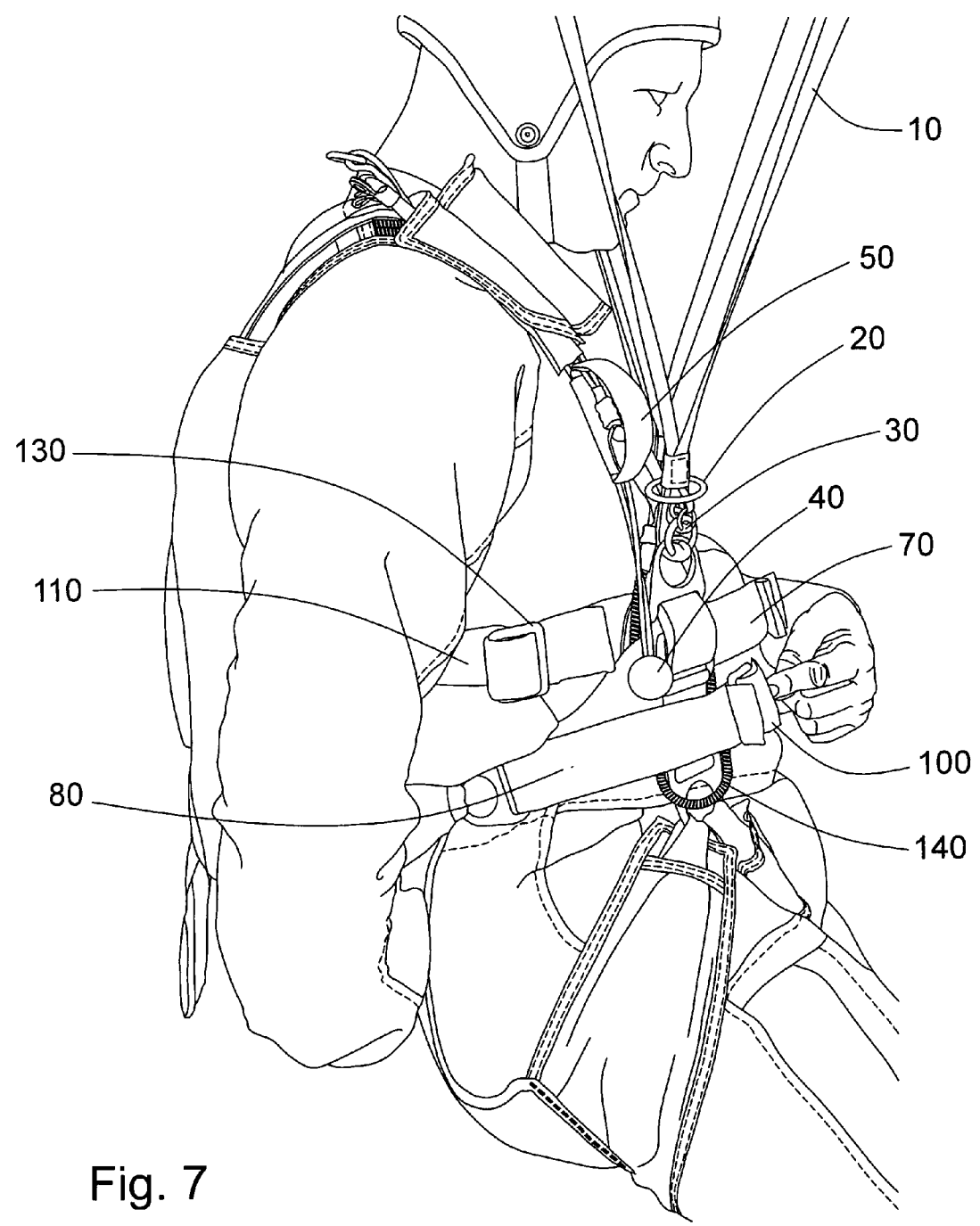
FIG. 7 is a side view of a version of the invention with parachutist initiating release of the optional lower lateral release.
Figure 8:
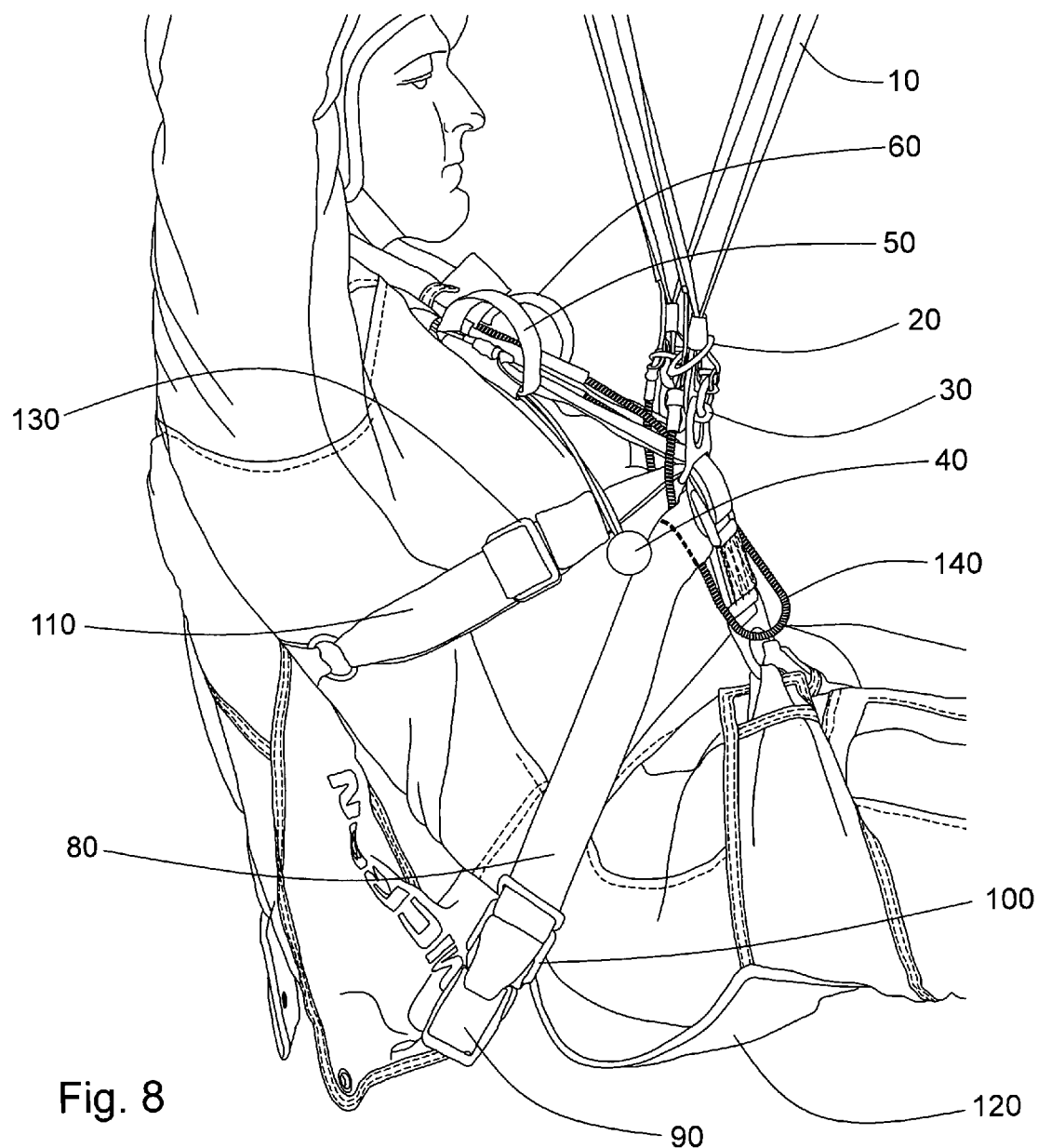
FIG. 8 is a side view of a version of the invention with parachutist after release of the optional lower lateral release to transition to full supine flight mode.
Figure 9:
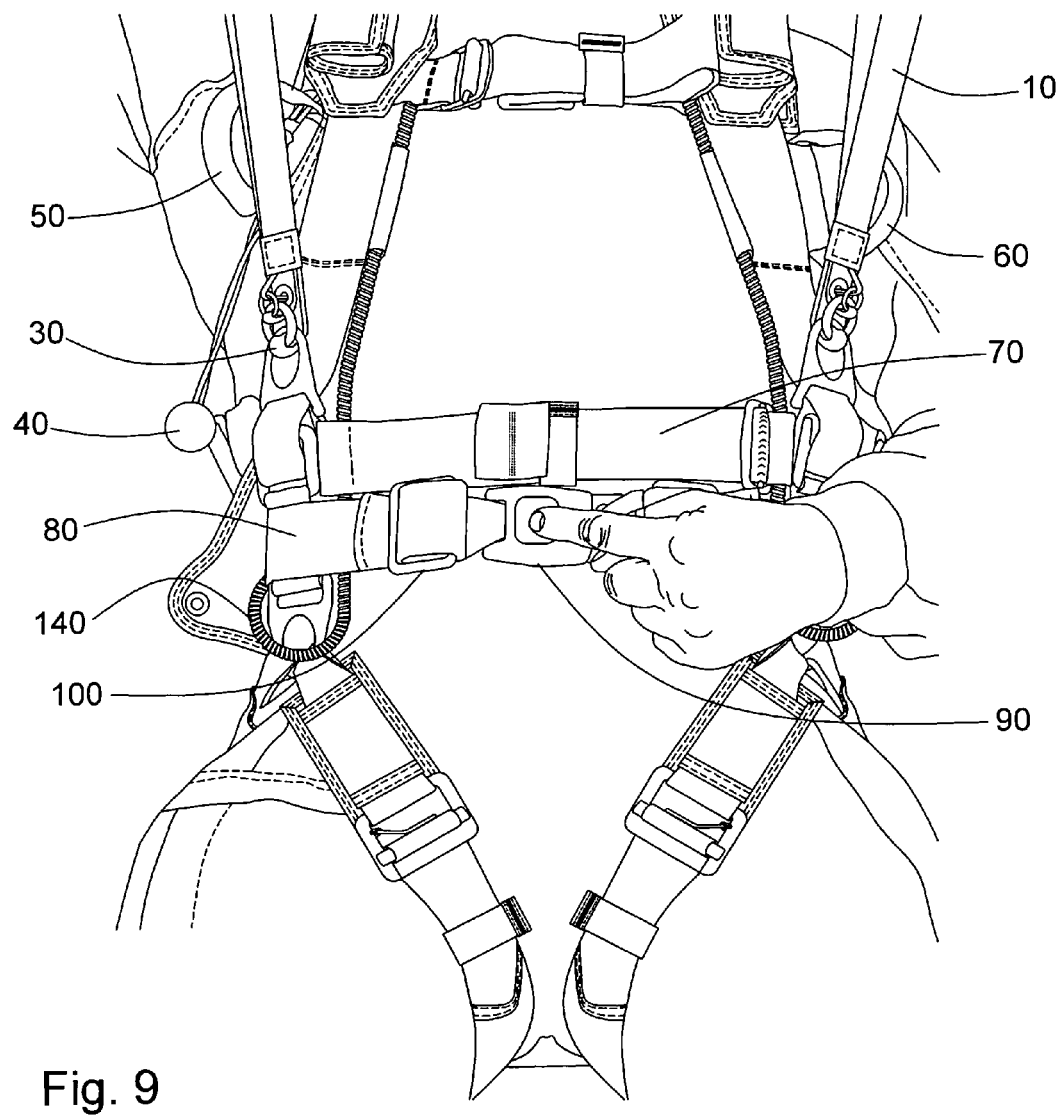
FIG. 9 is a front view of a version of the invention with parachutist initiating release of the optional lower lateral release.

A version of a preferred embodiment of the invention is depicted in FIG. 1 and FIG. 2. Materials such as DACRON, SPECTRA, nylon, webbing, thread, metal hardware, non-metallic hardware, straps, parachute harness hardware, adjustment hardware, friction adapters, flexible cables, flexible cable housings and other hardware and materials such as those found in Para Gear Equipment Company catalogue, Skokie, Ill. 60076-3438, USA, etc. are well known in the industry and may be used, as well as any other type materials suitable for this purpose.

The attachment means may be of any suitable type-loop, aperture, glue, sewn, webbing, fastener, screw, bolt, weld, connector link (either hard or "soft" as known in the art), grommet, snap, rivet, thread, rope, twine, rod, dowel, hook, plug, connector, and/or any other means, either attached/secured permanently, temporarily and/or releasably attached.

The components may be attached, connected, linked, related, affixed, disposed on, integrated into, adjoined, combined, bonded, united, associated, joined, tied, secured, bound, rigidly attached, flexibly attached, attached with rotational freedom in at one least axis, and/or integrated onto each other as desired by the manufacturer and/or operator.

At least one of the basic components is necessary but a plurality may be utilized if desired for different versions of the invention. Versions of the invention may be made with any and all suitable materials desired as needed for the appropriate use and is not limited by the type of materials that may be used. Versions are all scalable and may be made any suitable size; large, small and/or any size as desired. Versions of the invention may be retro-fitted to existing (new or used) conventional harnesses.

To make the invention in one embodiment, one skilled in the art would follow the instructions and illustrations disclosed in the manufacturing instructions entitled "Swooper Harness" as expressed, printed, shown and disclosed by the Engineering Department of Uninsured United Parachute Technologies, LLC dated Jun. 6, 2013 and all revisions and modifications made after that date, hereby incorporated by reference.

The primary requirements for successful use of versions of the invention are the design parameters set by the equipment manufacturer. These requirements may vary from one particular equipment manufacturer to another. Versions of the invention may be used with tandem parachute harnesses/systems to allow operation by an instructor and student and/or instructor and cargo after exiting an aircraft in flight. Versions may use only main parachute risers for use with BASE (building, antennae, span, earth) jumping and/or BASE wingsuit jumping. It is typical in BASE jumping to use only one main parachute with no reserve parachute system.

As depicted in FIG. 1 and FIG. 2, shown for example only and not intended to be limiting, a version shows the components of a version of the Swooper Harness (Swooper Harness is hereby defined as a parachute harness that deploys under parachute in vertical mode and is optionally convertible into supine mode while in flight). To make versions of the invention, all or some of these components are integrated into the parachute harness system, well known to one skilled in the art—main riser(s) 10, has a vertical-to-supine upper riser release mechanism 20, vertical-to-supine upper riser release mechanism cable(s) 25, lower cutaway release mechanism 30, lower cutaway release cable(s) 35, vertical-to-supine upper riser release handle 40 and dual cutaway release handle 50, optional outboard reserve activation handle 60, belly band 70, a plurality of straps in a pre-determined configuration, said configuration suitable for securing a parachutist during freefall and parachute deployment 75, (optional) retractable lower lateral 80, chest strap 45, lower lateral release 90, lower lateral stop (optionally adjustable) 100, back upper lateral 110, main lift web 85, back diagonals 65, back lower lateral 55, supine seat 120 and leg strap(s) 125. Also shown are optional adjustment hardware 130, optional reserve risers 15 and optional release cables 25, 35, release cable housing 140. The vertical-to-supine upper riser release/release mechanism may be a Vector 2 tandem drogue release/release system, well known in the industry or other suitable type release. The lower cutaway release/release mechanism may be a 3-ring release/release system, well known in the industry or other suitable type release. A version of the entire harness may be made with non-metallic hardware and non-metallic release systems for stealth/un-detection characteristics to radar or other similar type detection systems. This is especially advantageous for night military operations. Other components are shown in the drawings FIG. 3, FIG. 4, FIG. 5, FIG. 6, FIG. 7, FIG. 8 and FIG. 9 to further disclose operation of a version of the Swooper Harness in vertical mode and transition/conversion to partial supine mode and/or full supine mode. Supine mode (also called supine flight mode) is hereby defined as including partial supine mode and/or full supine mode configurations.

Figure 10:
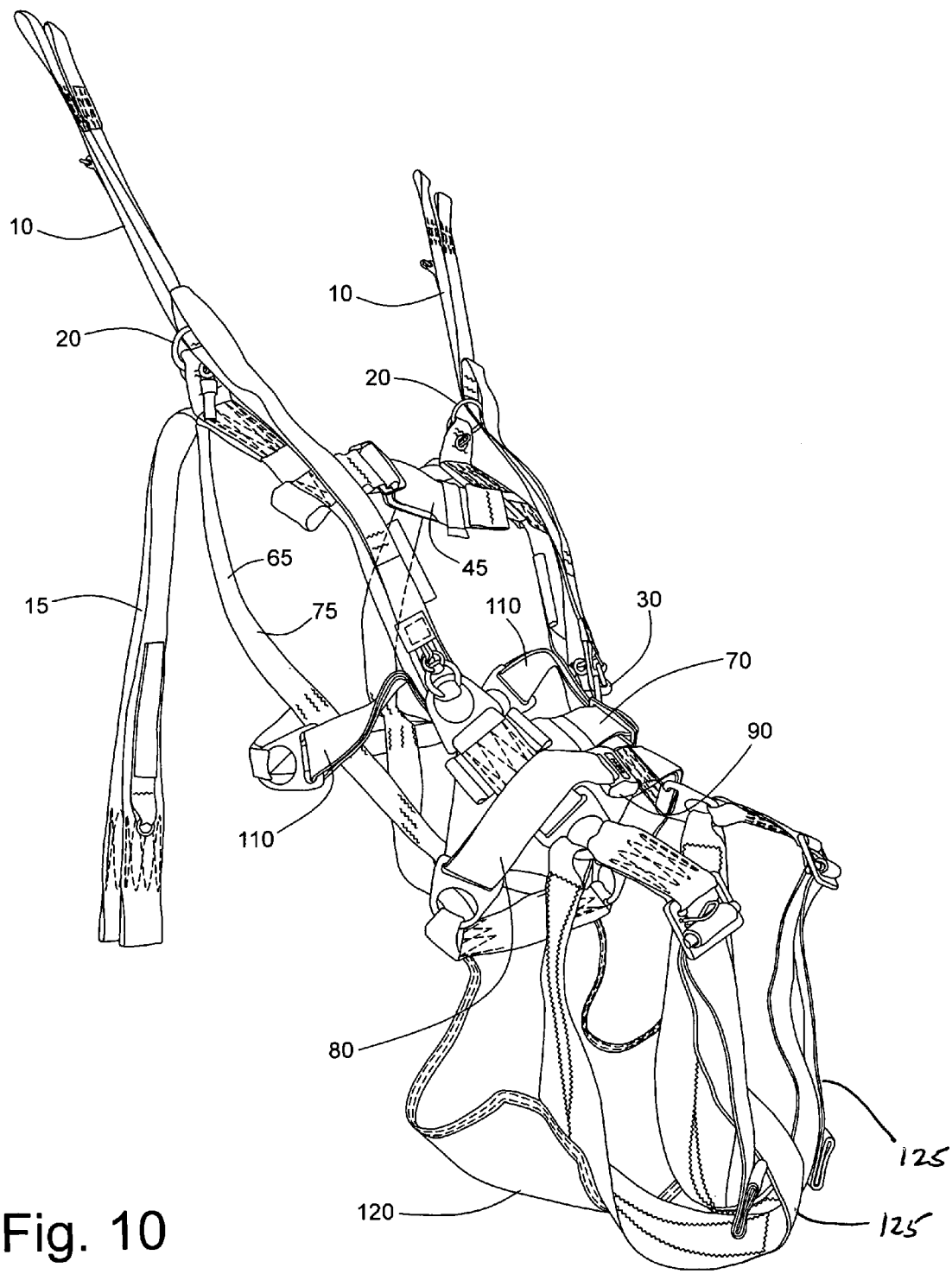
FIG. 10 is a 3-D view of a version of the invention in vertical flight mode.
Figure 11:
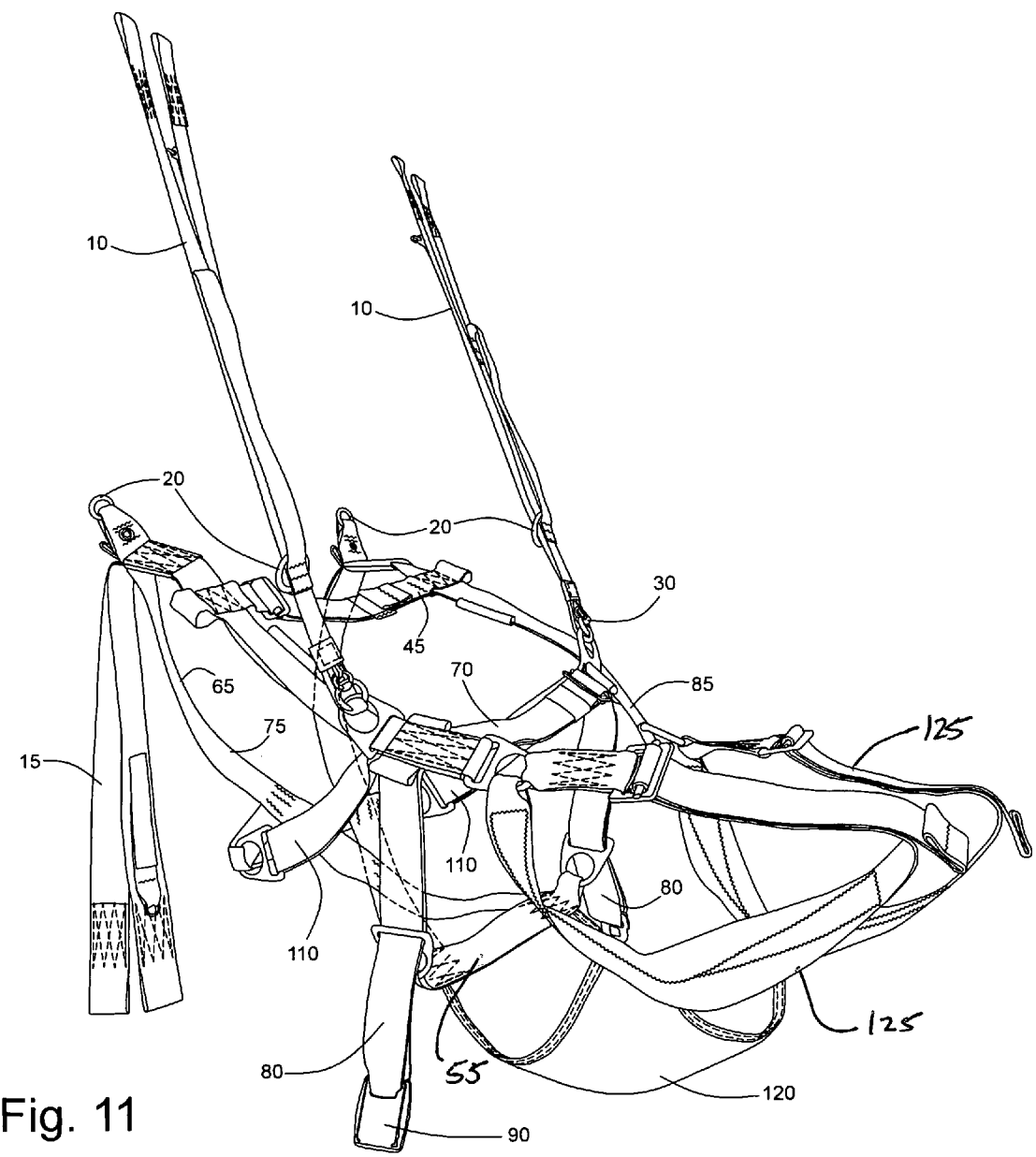
FIG. 11 is a 3-D view of a version of the invention in supine flight mode.
Figure 12:
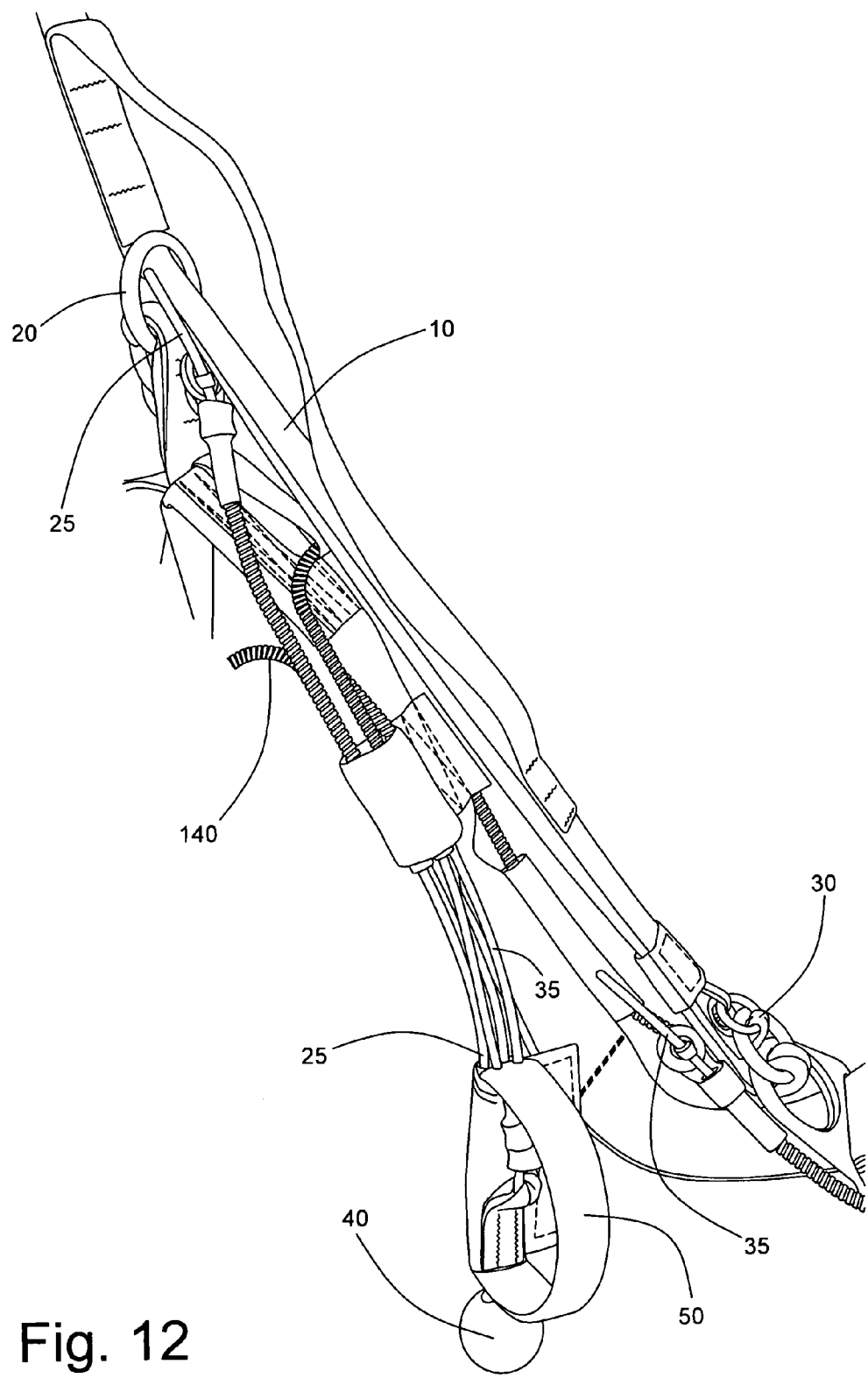
FIG. 12 is a 3-D view of a version of the invention.
Figure 13:
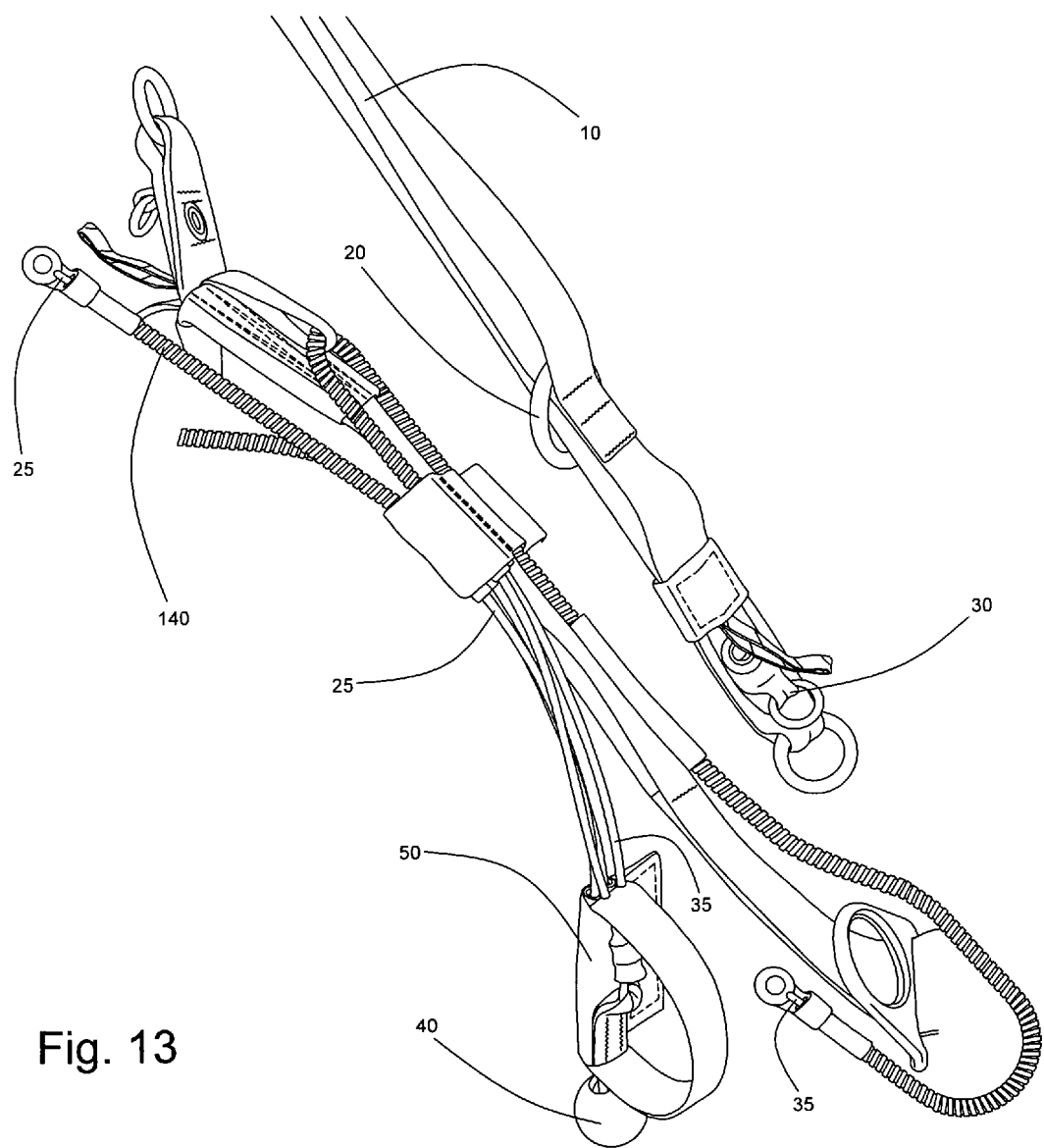
FIG. 13 is a 3-D view of a version of the invention.

A version of the invention is shown in FIG. 10 and FIG. 11 is disclosed. FIG. 12 and FIG. 13 show details of a version of the invention.

To use the invention in some embodiments, one skilled in the art would follow the instructions entitled "Jumping the Swooper Harness" expressed, printed, shown and disclosed by the Engineering Department of Uninsured United Parachute Technologies, LLC dated Jul. 11, 2013 and all revisions and modifications made after that date, hereby incorporated by reference.

For some versions, aircraft exit, freefall and main parachute deployment are performed as usual in the skydiving industry, military and/or sport. Or, some versions may be deployed via static line with no freefall portion of the descent. Once the main parachute is successfully deployed, the operator releases the retractable lower lateral via the lower lateral release (if used), then releases the vertical-to-supine upper riser release mechanism (or released vice versa) to establish supine flight mode/configuration and continues the parachute descent to landing. If the optional retractable lower lateral is not used, the parachutist only needs to release the vertical-to-supine upper riser release mechanism to transition to supine flight mode. Versions of the invention work and operate without the retractable lower lateral at different flight angles of attack of the operator/parachutist/pilot versus including the retractable lower lateral, as desired by the designer/manufacturer/operator/parachutist/pilot.

If the main parachute fails to successfully deploy (malfunction), the operator/parachutist would then pull dual cutaway release handle, releasing the main parachute from both release systems and then deploying the reserve parachute, if used, for a reserve parachute descent to landing. Versions of the invention may also be used suspended from a structure for operator training of versions of the invention, and vertical fight mode (as shown in FIG. 15) and supine/swoop mode (as shown in FIG. 16) activated by the operator while suspended for training purposes.

The release systems could also be of a pyrotechnic loop-cutting device such as CYPRES or Vigil, either automatically or manually electronically activated via a release handle disposed on the parachute harness as a "trigger" or remotely activated from a remote communication source, via radio, digital, analogue, cell phone, satellite phone and/or any other communication means. Or the release systems could be triggered by pre-set altitude sensing computer on the harness or remotely. The term "release handle" hereby is defined as shown in the drawings or encompassing other types remote "trigger(s)". These remote trigger(s) enable the release cables and/or cable housings to be optional and not mandatory for operating versions of the invention. The optional release cables and cable housings may be flexible or stiff/rigid as desired by the operator.

Figure 14:
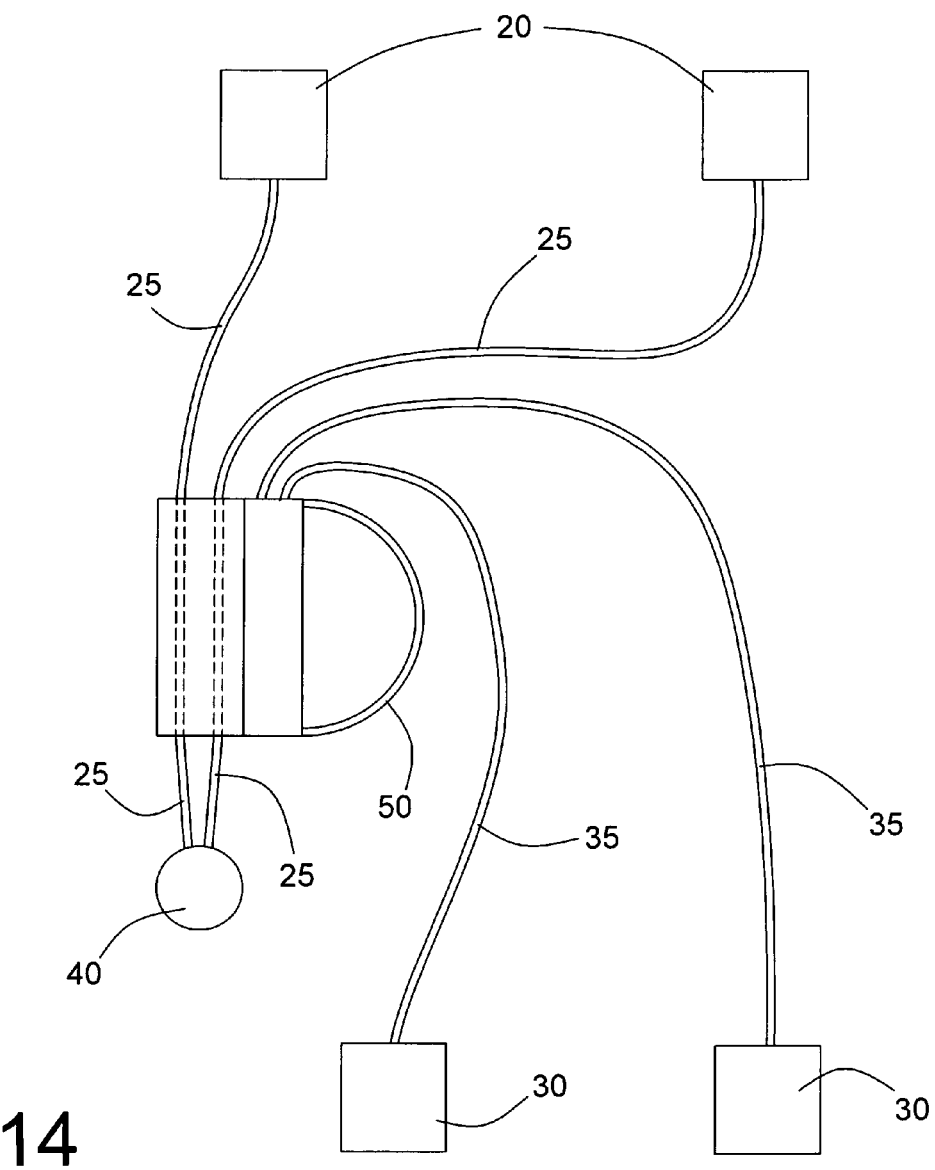
FIG. 14 is a schematic depiction of versions of the invention.

FIG. 14 shows a schematic of versions of the system. For instance, in some embodiments the physical cables are not needed if wirelessly activated or on-board computer activated. The on-board computer may be set for pre-determined altitudes, time since exiting aircraft, rate of descent, etc. or other freefall and/or flight parameters as desired by the operator.

Figure 15:
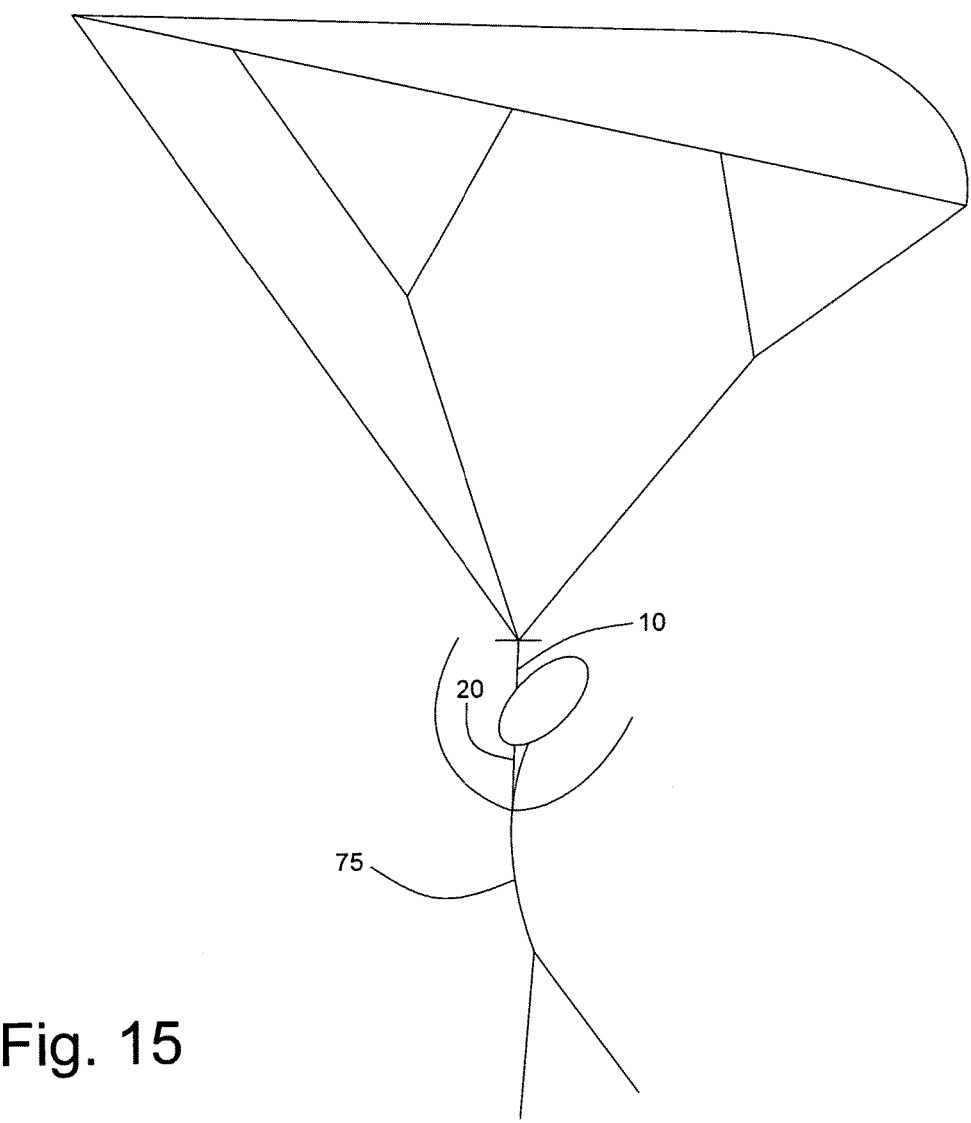
FIG. 15 is a schematic depiction of a version of the invention in vertical flight mode.
Figure 16:
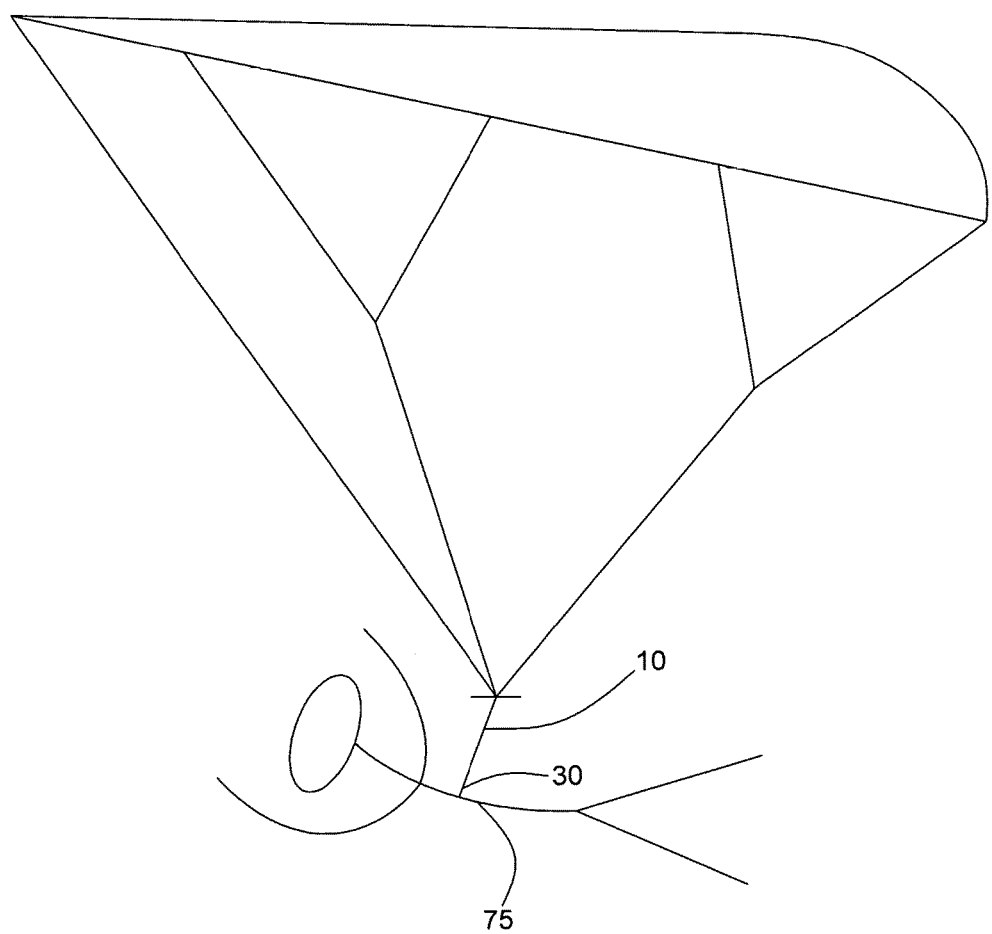
FIG. 16 is a schematic depiction of a version of the invention in swoop/supine flight mode.

FIG. 15 shows schematically the vertical flight mode for versions of the invention, while FIG. 16 shows schematically the supine/swoop flight mode after activation of versions of the invention.

The above-referenced list(s), option(s), function(s), instruction(s), component(s), application(s), interaction(s), item(s), product(s), good(s), group(s) and sub-group(s) are merely intended as illustration and examples, and are not intended by the inventor to in any way limit the addition, deletion or modification of any said list(s), option(s), function(s), instruction(s), component(s), application(s), interaction(s), item(s), product(s), good(s), group(s) and sub-group(s) as might be desirable or useful to someone skilled in the art.

As will be apparent to persons skilled in the art, such as a person in the parachute industry, parachute rigger, parachute designer, parachute manufacturer or other similar-type individuals, various modifications and adaptations of the structure and method of use above-described will become readily apparent without departure from the spirit and scope of the invention, the scope of which is defined in the claims. Although the foregoing invention has been described in detail by way of illustration and example, it will be understood that the present invention is not limited to the particular description and specific embodiments described but may comprise any combination of the above elements and variations thereof, many of which will be obvious to those skilled in the art. Additionally, the acts and actions of fabricating, assembling, using, and maintaining the preferred embodiment of this invention are well known by those skilled in the art. The invention may be embodied in other specific forms without departing from the spirit or essential characteristics thereof. The present embodiment is therefore to be considered in all respects as illustrative and not restrictive, the scope of the invention being indicated by the claims rather than by the foregoing description, and all changes which come within the meaning and range of equivalency of the claims are therefore intended to be embraced therein.

What is claimed is:

1. A parachute harness, comprising:
   a plurality of straps and hardware in a given pre-determined configuration, said configuration suitable for securing a parachutist during freefall and parachute deployment and,
   main parachute risers releasably attached to a vertical-to-supine upper riser release mechanism integrated into the parachute harness and the main parachute risers releasably attached to a lower cutaway release mechanism integrated into the parachute harness, further comprising a vertical-to-supine upper riser release handle disposed on the parachute harness to activate the vertical-to-supine upper riser release mechanism, and,
   the lower cutaway release mechanism activated via a dual cutaway release handle disposed on the parachute harness, and,
   a releasable belly band integrated into the parachute harness, and,
   a retractable lower lateral with a lower lateral release and lower lateral stop integrated into the parachute harness, and,
   a back upper lateral and back lower lateral integrated into the parachute harness, and,
   supine seat integrated into the parachute harness, wherein when the parachutist releases the vertical-to-supine upper riser release mechanism via the vertical-to-supine upper riser release handle and activates the lower lateral release, the parachute harness transitions from vertical flight mode to supine flight mode.

2. The parachute harness in claim 1 further comprising reserve risers integrated into the parachute harness.

3. The parachute harness in claim 1 further comprising a chest strap integrated into the parachute harness.

4. The parachute harness in claim 1 wherein the vertical-to-supine upper riser release mechanism is tandem drogue release system.

5. The parachute harness in claim 1 wherein the lower cutaway release mechanism is a 3-ring release system.

6. The parachute harness in claim 1 wherein the given plurality of straps are adjustable for lengths.

7. The parachute harness of claim 1 wherein the releasable belly band is adjustable for length.

8. The parachute harness of claim 1 wherein the retractable lower lateral is adjustable for length.

9. The parachute harness in claim 3 wherein the chest strap is adjustable for length.

10. A parachute harness, comprising:
    flexible webbing straps of given desired length, width and thickness, further comprising two main lift webs, and, a chest strap integrated between the two main lift webs, and, two vertical-to-supine upper release mechanisms integrated one each into the two main lift webs, and two main risers releasable attached to the two vertical-to-supine upper release mechanisms, and, two back diagonal crossing straps integrated into the two vertical-to-supine release mechanisms and integrated into a back lateral, said back lateral integrated into the main lift webs, and further comprising two leg straps and supine seat integrated into the two main lift webs, and, further comprising a belly band integrated into the main lift webs, and, further comprising a releasable and retractable lower lateral and lower lateral stop, and, further comprising a lower cutaway release mechanism and one dual cutaway release handle, and, further comprising lower cutaway release cables between the lower cutaway release mechanism and dual cutaway handle disposed onto one main lift web, further comprising a vertical-to-supine upper riser release handle disposed on one of the two main lift webs, and, further comprising vertical-to-supine cables between the vertical-to-supine upper riser release handle and vertical-to-supine upper riser release mechanism.

* * * * *